United States Patent [19]

Tang

[11] Patent Number: 5,519,087
[45] Date of Patent: May 21, 1996

[54] BINDERS FOR CERAMIC PRODUCTS

[75] Inventor: Xun Tang, Dresher, Pa.

[73] Assignee: Rohm and Haas Company, Philadelphia, Pa.

[21] Appl. No.: 430,641

[22] Filed: Apr. 28, 1995

[51] Int. Cl.$^6$ .............................. C08K 3/10; C04B 35/00
[52] U.S. Cl. .................. 524/779; 524/430; 524/431; 524/433; 524/444; 524/787; 524/789; 264/63; 501/1; 501/127
[58] Field of Search .................... 524/779, 786, 524/853, 430, 431, 433, 787, 789; 523/141; 264/63; 501/1, 127

[56] References Cited

U.S. PATENT DOCUMENTS

| | | | |
|---|---|---|---|
| 3,607,834 | 9/1971 | Marx et al. | 524/357 |
| 4,421,889 | 12/1983 | Braun et al. | 524/381 |
| 4,735,974 | 4/1988 | Mandorf | 524/786 |
| 5,332,537 | 7/1994 | Hens et al. | 264/22 |
| 5,368,795 | 11/1994 | Quadir | 264/63 |
| 5,391,624 | 2/1995 | Rasoul et al. | 525/216 |
| 5,393,604 | 2/1995 | Sanchez | 264/63 |

FOREIGN PATENT DOCUMENTS

| | | |
|---|---|---|
| 555774 | 8/1993 | European Pat. Off. . |
| 9316133 | 8/1993 | WIPO . |

*Primary Examiner*—Tae Yoon
*Attorney, Agent, or Firm*—David T. Banchik

[57] ABSTRACT

Binders for ceramic products are provided which are crosslinkable and impart improved tensile strength to ceramic green bodies. The binders are particularly useful in tape-casting processes for the manufacture of thin ceramic sheets which are used as substrates for electronic packaging.

6 Claims, No Drawings

BINDERS FOR CERAMIC PRODUCTS

The present invention relates to binders for ceramic products. More particularly, the present invention relates to binders for ceramic products which increase the tensile strength of ceramic products. These binders are particularly useful in tape-casting processes.

"Emulsion polymer" as used herein refers to a water-insoluble polymer which is prepared by emulsion polymerization techniques.

"Glass transition temperature," or "Tg," as used herein means the temperature at or above which a glassy polymer will undergo segmental motion of the polymer chain. Glass transition temperatures of a polymer can be estimated by the Fox equation [Bulletin of American Physics Society 1, 3, page 123 (1956)] as follows:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers, and $T_{g(1)}$ and $T_{g(2)}$ refer to the glass transition temperatures of the two corresponding homopolymers. For polymers containing three or more monomers, additional terms are added ($w_n/T_{g(n)}$). The Tg of a polymer can also be measured by various techniques including, for example, differential scanning calorimetry ("DSC").

As used herein, acrylate and methacrylate are referred to as "(meth)acrylate," acrylic acid and methacrylic acid are referred to as "(meth)acrylic acid."

Ceramic materials are often used to prepare lightweight, strong, thermally and chemically resistant products useful as chromatographic media, grinding aids, abrasives, catalysts, adsorbents, electronic components, construction components and machine components. In the manufacture of ceramic products, ceramic materials in the form of a powder are formed into green bodies by preparing a slurry of the ceramic powder and drying the slurry in a predetermined shape, or by subjecting the ceramic powder to elevated pressures. Using these methods, ceramic green bodies can be prepared in various shapes and sizes. The size and shape of the green bodies can also be altered by machining, cutting or stamping the green body. One of the more important commercial processes in the manufacture of thin sheets of ceramic materials is tape-casting. Tape-casting is particularly useful for preparing thin sheets of ceramic materials used for multilayer capacitors, electronic packages and substrates.

Binders are needed in the manufacture of ceramic materials to impart tensile strength. In the manufacture of thin ceramic sheets, binders should also impart flexibility and elasticity to the ceramic green tapes. Strength and flexibility are required in tape-casting processes so that the tape can be removed from the carrier substrate and handled without breakage. Frequently, thin ceramic sheets are removed from the carrier substrate and stored in rolls. Green strength also enables the tapes to withstand the subsequent cutting, printing, laminating, and final dicing processes.

One mechanism by which binders impart strength is by forming a crosslinked network throughout the ceramic green body. U.S. Pat. No. 5,332,537 to Hens, et al., discloses a method of crosslinking binders in a ceramic body by either a thermosetting reaction or by exposing the green body containing the binders to ultraviolet radiation. Thus, the methods taught by Hens, et al. require a separate process step in order to effectuate the crosslinking of the binders in the ceramic green body. This additional process step adds to the time needed to impart sufficient green strength and requires the use of additional equipment.

The present invention seeks to overcome the problems associated with the previously known methods of crosslinking binders in a ceramic green body. The present invention seeks to provide a process for preparing ceramic green bodies using a binder system which imparts good strength and which is capable of crosslinking without requiring a separate heating step.

According to a first aspect of the present invention, there is provided an aqueous ceramic slurry comprising:
 (a) from 10 to 90 percent by weight of the slurry of ceramic particles;
 (b) from 0.5 to 50 percent by weight based on the weight of ceramic particles of at least one polymer, wherein said polymer comprises, as polymerized units, monoethylenically unsaturated acetoacetyl-group containing (meth)acrylate monomer;
 (c) a sufficient amount of at least one polyfunctional amine to provide a level of from 0.01 to 100 moles of amine functionality per mole of acetoacetyl-group containing (meth)acrylate monomer; and
 (d) water such that the total equals 100 percent.

According to a second aspect of the present invention, there is provided a ceramic green body comprising
 (a) ceramic particles and
 (b) a crosslinked binder system formed by the reaction of
  (i) at least one polymer, wherein said polymer comprises, as polymerized units, monoethylenically unsaturated acetoacetyl-group containing (meth)acrylate monomer; with
  (ii) at least one polyfunctional amine.

According to a third aspect of the present invention, there is provided a method for preparing a ceramic green body comprising
 (I) forming an aqueous ceramic slurry comprising
 (a) from 10 to 90 percent by weight of the slurry of ceramic particles;
 (b) from 0.5 to 50 percent by weight based on the weight of ceramic particles of at least one polymer, wherein said polymer comprises, as polymerized units, monoethylenically unsaturated acetoacetyl-group containing (meth)acrylate monomer;
 (c) a sufficient amount of at least one polyfunctional amine to provide a level of from 0.01 to 100 moles of amine functionality per mole of acetoacetyl-group containing (meth)acrylate monomer; and
 (d) water, such that the total equals 100 percent;
 (II) drying the aqueous ceramic slurry to form a green body.

Ceramic particles suitable for the present invention include oxide, nitride and carbide ceramics. Examples of suitable ceramic particles include alumina, aluminum nitride, silica, silicon, silicon carbide, silicon nitride, sialon, zirconia, zirconium nitride, zirconium carbide, zirconium boride, titanium nitride, titanium carbide, barium titanate, titanium boride, boron nitride, boron carbide, tungsten carbide, tungsten boride, and oxides of tin, lead, ruthenium, tungsten, yttrium, nickel, magnesium, calcium, and mixtures thereof. Preferred ceramic particles include alumina, barium titanate, silicon carbide, silicon nitride and zirconia. The morphology of the ceramic particles is not critical but is preferably approximately spherical. The ceramic particles are present in the aqueous ceramic slurry at a level of from 10 to 90, preferably from 30 to 80, most preferably from 50 to 75 percent by weight of the aqueous ceramic slurry.

The polymers useful in the present invention may be emulsion polymers or water-soluble polymers. Preferably, the polymers are emulsion polymers. The polymers useful in the present invention comprise, as polymerized units, monoethylenically unsaturated acetoacetyl-group containing (meth)acrylate monomer. Suitable monoethylenically unsaturated acetoacetyl-group containing (meth)acrylate monomers include, for example, acetoacetoxyethyl methacrylate ("AAEM"), acetoacetoxyethyl acrylate, acetoacetoxypropyl methacrylate, acetoacetoxybutyl methacrylate and 2,3-di-(acetoacetoxy)propyl methacrylate. The polymers may be homopolymers of the monoethylenically unsaturated acetoacetyl-group containing (meth)acrylate monomer or copolymers of the monoethylenically unsaturated acetoacetyl-group containing (meth)acrylate monomer and one or more other copolymerizable monomers. Preferably, the polymers used in the present invention are copolymers comprising from 2 to 50, more preferably from 5 to 40 percent by weight of monoethylenically unsaturated acetoacetyl-group containing (meth)acrylate monomer.

The polymers comprising, as polymerized units, monoethylenically unsaturated acetoacetyl-group containing (meth)acrylate monomer preferably have a Tg below 50° C., more preferably in the range of from −40° C. to 30° C. The Tg has a pronounced effect on the mechanical properties of the green body. For example, lower Tg polymer will result in a more flexible green body, whereas a higher Tg will result in a stiffer green body.

Methods for preparing polymers comprising, as polymerized units, monoethylenically unsaturated acetoacetyl-group containing (meth)acrylate monomer, are well known to those skilled in the art of polymerization. Synthesis parameters, such as the selection and levels of emulsifier, initiators, processing conditions (temperature, pressure, feed rates, stirring), pH, and the like, are within the ordinary skill of persons skilled in the art of emulsion polymerization and do not form a part of the present invention. Methods for preparing polymers comprising, as polymerized units, monoethylenically unsaturated acetoacetyl-group containing (meth)acrylate monomer, are taught, for example, in U.S. Pat. No. 4,421,889 and U.S. Pat. No. 3,607,834.

The polymers comprising, as polymerized units, monoethylenically unsaturated acetoacetyl-group containing (meth)acrylate monomer are preferably in the form of an emulsion having a level of polymers solids of from 20 percent to 70 percent, most preferably from 25 percent to 65 percent by weight based on the total weight of the emulsion.

The aqueous ceramic slurry contains a sufficient amount of at least one polyfunctional amine to provide a level of from 0.01 to 100, preferably from 0.1 to 10, moles of amine functionality per mole of acetoacetyl-group containing (meth)acrylate monomer. Suitable polyfunctional amines contain two or more amine moieties. Examples of suitable polyfunctional amines include, for example, hexamethylene diamine, 2-methyl pentamethylene diamine, 1,3-diamino pentane, dodecane diamine, 1,2-diamino cyclohexane, 1,4-diamino cyclohexane, para-phenylene diamine, 3-methyl piperidene, isophorone diamine, bis-hexamethylene triamine, diethylene triamine, and combinations thereof. Other suitable polyfunctional amines include, for example, polyfunctional amines containing adducts of ethylene oxide, propylene oxide, or a combination thereof such as the "JEFFAMINE" series D, ED and T of Texaco Chemical Co. of Houston, Tex., USA.

The aqueous ceramic slurry preferably contains water at a level of from about 90 to about 10, more preferably from about 70 to about 20 percent by weight of the aqueous ceramic slurry.

In addition, one or more conventional ceramic processing aids or other conventional additives may be added to the aqueous ceramic slurry. Conventional processing aids and additives include, for example, other binders, plasticizers, dispersants, lubricants, biocides, sintering aids and foam suppressants. If used, the one or more conventional processing aids or other conventional additives may be present at a level of up to 20 or more, preferably from 0.1 to 15 percent by weight based on the weight of the one or more ceramic particles.

The aqueous ceramic slurry is dried to form a green body. The aqueous ceramic slurry can be formed, cast or molded by any conventional process prior to, or as a means for drying the aqueous ceramic slurry to form a green body. Suitable methods for drying the aqueous ceramic slurry to form a green body include, for example, air drying, tumble drying, pan drying, oven drying, microwave drying and spray drying to produce a dried ceramic mixture. Preferably, the aqueous ceramic slurry is cast, such as by slipcasting techniques or tape casting techniques prior to drying. After the aqueous ceramic slurry has been cast, it is dried at, or above room temperature for a sufficient time to form a green body. The length of time needed to form a green body will depend on such factors as the solids level of the slurry, the temperature at which drying occurs, the hydrophilicity of the ceramic particles and the additives, the thickness of the wet slurry, and the material used for the substrate on or in which the slurry is cast.

The mechanism by which the polyfunctional amine and the acetoacetyl-group react is not strongly dependent on temperature. The reaction proceeds by evaporation of ammonia which occurs as the slurry dries. Thus, while elevated temperatures may accelerate the rate at which the slurry dries to form a green body, elevated temperatures are not necessary for the reaction of the polyfunctional amine and the acetoacetyl-group.

To form a final ceramic product, the green body may be fired or sintered. The preferred temperature and time needed to sinter a green body to form a final ceramic product is partly dependent upon the type of ceramic used to make the ceramic green body. In general, it is preferred to sinter the ceramic green body to make the final ceramic product by heating the ceramic green body to a temperature of at least about 800° C., most preferably from about 1,000° C. to about 2,000° C., preferably for from about 5 minutes to about 5 hours, most preferably from about 10 minutes to about 60 minutes.

EXPERIMENTAL PROCEDURE

Slurry Preparation

To a 0-ball mill jar was added approximately 2200 grams of alumina grinding media (approximately ½ inch×½ inch cylinders), 1200 grams of Alcoa A-16SG alumina having a mean particle size of 0.5 microns, approximately 252 grams of deionized water and 10.32 grams of a 35 percent by weight aqueous solution of an ammonium salt of poly-(acrylic acid) as a dispersant. The solids level of the slurry was 82 percent by weight. The ball mill jar was sealed, and the contents were milled for 3 hours at 80 to 100 revolutions per minute. The ball mill jar was opened, and the aqueous ceramic slurry was decanted to separate it from the grinding media. Aliquots (approximately 120 grams each) of the aqueous ceramic slurry were placed in glass jars.

One or more of the following binder components were added to the aliquots of the aqueous ceramic slurry:

Polymer A: a 48 percent by weight aqueous dispersion of emulsion polymer having the following monomer composition −10 percent by weight AAEM, 55 percent by weight butylacrylate ("BA"), 33.5 percent by weight methylmethacrylate ("MMA"), 1.5 percent by weight methacrylic acid; Tg (as measured by differential scanning calorimetry) 10° C.

Polymer B: a 55 percent by weight aqueous dispersion of emulsion polymer having the following monomer composition—98 percent by weight BA, 2 percent by weight methacrylic acid; Tg (as measured by differential scanning calorimetry) –40° C.

Polymer C: a blend of: 9.5 parts by weight of a conventional acrylic emulsion polymer binder having a Tg of 14° C. and 0.5 parts by weight of a conventional acrylic emulsion polymer binder having a –15° C.

Polyfunctional Amine-1: Jeffamine®D-400, a liquid polyoxyalkylenediamine with molecular weight of 400.

Polyfunctional Amine-2: Jeffamine®T-403, a liquid polyoxyalkylenetriamine with molecular weight of 403.

The binder components described above were added to the aliquots of the aqueous ceramic slurry to provide 12 percent by weight of total polymer solids based on the level of alumina. When used, the polyfunctional amine was added to a level of 2.2 percent by weight based on Polymer A solids. After the binder components were added, the aliquots were stirred with an overhead mixer for 30 minutes then filtered through a 100 mesh (149 microns) sieve.

The filtered aliquots were then cast with a doctor blade at a speed of approximately 12 centimeters per minute onto Mylar tapes pre-coated with a thin layer of ammonium stearate. The wet thickness was 254 μm (10 mil). The wet tapes were dried at 150° C. in a forced air oven for 20 minutes. The dry thickness was 127–152 μm (5–6 mil) depending on formulations.

The tensile properties of the green tapes were measured on an Instron Universal Testing Machine, Model 1122. Standard tensile bar specimens (dog-bone shape) were prepared with a 0.635 cm tensile width and a 1.91 cm gauge length (narrow tensile section). The specimens were cut from the green tapes using a razor template. Air-accentuated grips with constant pressure were used to eliminate tear at the grip section. A crosshead speed of 0.25 cm per minute was used in this study. Data were acquired using an Instron Series IX Automated Materials Testing System 1.01 program. The data reported below is an average of at least 10 measurements.

TABLE I

| Example | POLYMER A | B | C | Amine | Tensile Strength (MPa) | Strain at Break (%) |
|---|---|---|---|---|---|---|
| 1 | 12 | — | — | A/2.2 | * | * |
| 2 | 4.8 | 7.2 | — | A/2.2 | 2.34 ± 0.11 | 14.7 ± 1.6 |
| 3 | 3.6 | 8.4 | — | A/2.2 | 1.81 ± 0.12 | 15.3 ± 1.7 |
| 4 | 3.6 | 8.4 | — | B/1.4 | 1.63 ± 0.15 | 13.2 ± 1.3 |
| 5 | 2.4 | 9.6 | — | A/2.2 | 1.87 ± 0.10 | 15.9 ± 1.7 |
| 6 | 1.2 | 10.8 | — | A/2.2 | 1.54 ± 0.15 | 16.3 ± 1.0 |
| Comp. 1 | 4.8 | 7.2 | — | — | 1.19 ± 0.05 | 12.4 ± 0.6 |
| Comp. 2 | | 12 | — | — | 1.09 ± 0.06 | 11.7 ± 1.5 |
| Comp. 3 | | | 12 | — | 0.73 ± 0.15 | 7.5 ± 1.6 |

*The green tape prepared in Example 1 was too brittle to form integrated green tapes, thus Instron tensile properties could not be measured.

The green body prepared in Example 1 appeared to be highly crosslinked. The green tapes broke apart upon drying. It is believed that the inability to form a flexible tape was a result of the increased stiffness of the tape attributable to extensive crosslinking which significantly increased the effective Tg of the binder system.

Example 2 was designed to overcome the stiffness of the green tape prepared in Example 1. The green tape in Example 2 contained less of the acetoacetyl-group containing polymer, the same relative amount of polyfunctional amine, and contained a softer (lower Tg), conventional non-crosslinking binder. The tape prepared in Example 2 was sufficiently flexible to allow the measurement of tensile properties. Examples 3, 5 and 6 were similar to Example 2, showing the effects on tensile properties by varying the relative amounts of crosslinking binder system (polyfunctional amine and acetoacetyl-group containing polymer) and conventional non-crosslinking binder. Example 4 was similar to Example 3, except that a polyfunctional triamine was used.

The comparative data in comparative Example 1 show that the absence of polyfunctional amine did not result in comparable tensile properties. The comparative data in comparative Examples 2 and 3 show the tensile properties from a conventional non-crosslinked binder system which show lower tensile strength and strain at break compared to the binder system of the present invention.

We claim:

1. An aqueous ceramic slurry comprising:
   (a) from 10 to 90 percent by weight of the slurry of ceramic particles selected from the group consisting of alumina, aluminum nitride, silica, silicon carbide, silicon nitride, sialon, zirconia, zirconium nitride, zirconium carbide, zirconium boride, titanium nitride, titanium carbide, barium titanate, titanium boride, boron nitride, boron carbide, tungsten carbide, tungsten boride, and oxides of tin, lead, ruthenium, tungsten, yttrium, nickel, magnesium, and calcium, and mixtures thereof;
   (b) from 0.5 to 50 percent by weight based on the weight of ceramic particles of at least one polymer, wherein said polymer comprises, as polymerized units, monoethylenically unsaturated acetoacetyl-group containing (meth)acrylate monomer;
   (c) a sufficient amount of at least one polyfunctional amine to provide a level of from 0.01 to 100 moles of amine functionality per mole of acetoacetyl-group containing (meth)acrylate monomer; and
   (d) water such that the total equals 100 percent.

2. A ceramic green body comprising
   (a) ceramic particles selected from the group consisting of alumina, aluminum nitride, silica, silicon carbide, silicon nitride, sialon, zirconia, zirconium nitride, zirconium carbide, zirconium boride, titanium nitride, titanium carbide, barium titanate, titanium boride, boron nitride, boron carbide, tungsten carbide, tungsten boride, and oxides of tin, lead, ruthenium, tungsten, yttrium, nickel, magnesium, and calcium, and mixtures thereof; and,
   (b) a crosslinked binder system formed by the reaction of
       (i) at least one polymer, wherein said polymer comprises, as polymerized units, monoethylenically unsaturated acetoacetyl-group containing (meth)acrylate monomer; with
       (ii) at least one polyfunctional amine.

3. A method for preparing a ceramic green body comprising
   (I) forming an aqueous ceramic slurry comprising
      (a) from 10 to 90 percent by weight of the slurry of ceramic parades selected from the group consisting of alumina, aluminum nitride, silica, silicon carbide, silicon nitride, sialon, zirconia, zirconium nitride, zirconium carbide, zirconium boride, titanium nitride, titanium carbide, barium titanate, titanium boride, boron nitride, boron carbide, tungsten carbide, tungsten boride, and oxide of tin, lead, ruthenium, tungsten, yttrium, nickel, magnesium, and calcium, and mixtures thereof;

(b) from 0–5 to 50 percent by weight based on the weight of ceramic particles of at least one polymer, wherein said polymer comprises, as polymerized units, monoethylenically unsaturated acetoacetyl-group containing (meth)acrylate monomer;

(c) a sufficient amount of at least one polyfunctional amine to provide a level of from 0.01 to 100 moles of amine functionality per mole of aceteoacetyl-group containing (meth)acrylate monomer; and (d) water, such that the total equals 100 percent;

(II) drying the aqueous ceramic slurry to form a green body.

4. The aqueous ceramic slurry of claim 1 wherein the ceramic particles are selected from the group consisting of alumina, barium titanate, silicon carbide, silicon nitride and zirconia.

5. The ceramic green body of claim 2 wherein the ceramic particles are selected from the group consisting of alumina, barium titanate, silicon carbide, silicon nitride and zirconia.

6. The method of claim 3 wherein the ceramic particles are selected from the group consisting of alumina, barium titanate, silicon carbide, silicon nitride and zirconia.

\* \* \* \* \*